United States Patent
Mignano

(10) Patent No.: US 7,708,519 B2
(45) Date of Patent: May 4, 2010

(54) VORTEX SPOILER FOR DELIVERY OF COOLING AIRFLOW IN A TURBINE ENGINE

(75) Inventor: Frank A. Mignano, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 602 days.

(21) Appl. No.: 11/691,307

(22) Filed: Mar. 26, 2007

(65) Prior Publication Data

US 2009/0067986 A1    Mar. 12, 2009

(51) Int. Cl.
*F01D 5/14*    (2006.01)
(52) U.S. Cl. ............. 415/157; 415/115; 415/170.1; 415/202; 415/208.2
(58) Field of Classification Search ............ 415/115, 415/157, 171, 202, 208.2
See application file for complete search history.

(56) References Cited

U.S. PATENT DOCUMENTS

| | | | | |
|---|---|---|---|---|
| 4,127,988 A | * | 12/1978 | Becker | 415/115 |
| 4,236,869 A | * | 12/1980 | Laurello | 416/95 |
| 4,439,104 A | | 3/1984 | Edmonds | |
| 4,531,356 A | | 7/1985 | Linder | |
| 4,541,774 A | * | 9/1985 | Rieck et al. | 415/175 |
| 4,595,339 A | * | 6/1986 | Naudet | 416/95 |
| 4,844,695 A | | 7/1989 | Banks et al. | |
| 4,919,590 A | | 4/1990 | Stratford et al. | |
| 5,373,691 A | | 12/1994 | Gardner et al. | |
| 5,851,105 A | | 12/1998 | Fric et al. | |
| 5,997,244 A | * | 12/1999 | Gebre-Giorgis et al. | 415/175 |
| 6,398,487 B1 | * | 6/2002 | Wallace et al. | 415/191 |
| 6,773,225 B2 | | 8/2004 | Yuri et al. | |
| 6,872,048 B2 | | 3/2005 | Uselton et al. | |
| 7,086,830 B2 | * | 8/2006 | Fitzgerald et al. | 416/244 R |
| 7,159,402 B2 | * | 1/2007 | Hein et al. | 415/115 |
| 2003/0091436 A1 | | 5/2003 | Stiesdal | |
| 2003/0095864 A1 | | 5/2003 | Ivanovic | |

FOREIGN PATENT DOCUMENTS

EP    1750012 A1 *  2/2007

* cited by examiner

*Primary Examiner*—Igor Kershteyn
(74) *Attorney, Agent, or Firm*—Ingrassia Fisher & Lorenz, P.C.

(57) ABSTRACT

A vortex spoiler (180) for delivery of a cooling airflow (192) in a turbine (108) engine (100) including a plurality of inlet ports (182) formed circumferentially about a radial exterior sidewall (188), and a plurality of outlet ports (184) formed circumferentially about a radial interior sidewall (190). The plurality of inlet ports (182) are coupled to the plurality of outlet ports (184) via a plurality of ducts (186). Each of the ducts is formed having an interior diameter at the inlet port and the outlet port formed at a preselected angle normal to the surface of the each of the radial sidewalls to form a radially curved profile such that a cooling airflow (192) may pass radially inwardly through each of the plurality of ducts (186) with minimal tangential stress and minimal static pressure loss.

19 Claims, 6 Drawing Sheets

VORTEX SPOILER FOR DELIVERY OF COOLING AIRFLOW IN A TURBINE ENGINE

STATEMENT REGARDING FEDERALLY SPONSORED RESEARCH OR DEVELOPMENT

This invention was made with Government support under Contract No. F3361503D2355006 awarded by U.S. Air Force. The Government has certain rights in this invention.

TECHNICAL FIELD

The present invention generally relates to turbine engines and more particularly to a vortex spoiler used in the delivery of a cooling airflow to downstream components in the turbine engine.

BACKGROUND

Turbine engines are used as the primary power source for many types of aircraft. The engines are also auxiliary power sources that drive air compressors, hydraulic pumps, and industrial gas turbine (IGT) power generation. Further, the power from turbine engines is used for stationary power supplies such as backup electrical generators for hospitals and the like.

Most turbine engines generally follow the same basic power generation procedure. Compressed air generated by axial and/or radial compressors is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, fans, electrical generators, or other devices.

Engineers have progressively pushed turbine engines to extreme operating conditions in an attempt to increase the efficiency and performance of the turbine engines. Extreme operating conditions generate high temperatures and thus high heat conditions, and high pressure conditions that are known to place increased demands on engine components, manufacturing and technologies. As a result, these engine components need to be cooled during operation to increase the life of the components.

A vortex spoiler traditionally delivers at least a portion of the cooling necessary to reduce the heat generated by these extreme operating conditions. Traditionally, the vortex spoiler is positioned between an impellor and a hub of the turbine engine and serves to deliver a secondary cooling air flow to downstream components. The vortex spoiler is typically machined using an end mill process and includes a straight, radially configured profile defined by a plurality of blade defined passages. However, a traditional vortex spoiler having a radially configured profile produces a rather large pressure loss at an exit of a duct that leads to the turbine components being cooled. This large pressure loss results in a decrease in the delivery of air flow to the components downstream. In addition to this large air pressure loss, undesirable tangential stresses can be created.

It should thus be appreciated from the above that it would be desirable to provide a vortex spoiler that is configured to deliver cooling air at an exit leading to the turbine components without a resulting significant pressure loss. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a vortex spoiler that is configured to deliver cooling air at an exit leading to a plurality of downstream turbine components without a resulting significant pressure loss or creation of tangential stresses.

In one embodiment, and by way of example only, provided is a vortex spoiler for delivery of a cooling airflow in a turbine engine including a radial exterior sidewall, a radial interior sidewall, a core area, a plurality of inlet ports, a plurality of outlet ports and a plurality of bores. The radial exterior sidewall is positioned to rotate about an axis of rotation. The radial interior sidewall is disposed radially inward of, and surrounded by, the radial exterior sidewall. The core area is coupled between the radial exterior sidewall and the radial interior sidewall, extending inwardly perpendicularly to the axis of rotation. The plurality of inlet ports are formed in and spaced circumferentially about the radial exterior sidewall. The plurality of outlet ports are formed in and spaced circumferentially about the radial interior sidewall. The plurality of bores extend through the core area and define a plurality of ducts that fluidly communicate the inlet ports and the outlet ports. Each of the plurality of ducts is configured such that a cooling airflow may pass radially inwardly with minimal tangential stress and minimal static pressure loss.

In yet another embodiment, and by way of example only, provided is a gas turbine engine having a compressor section that includes a plurality of rotary compressor stages interconnected by a rotary shaft and a secondary cooling airflow system. The turbine engine includes a collecting chamber arranged to collect pressurized, substantially nonswirling, cooling airflow from the compressor section and a vortex spoiler in fluidic communication with the collecting chamber and interconnected to rotate with the rotary shaft. The vortex spoiler includes a radial exterior sidewall and a radial interior sidewall disposed radially inward of, and surrounded by, the radial exterior sidewall. The vortex spoiler further includes a core area coupled between the radial exterior sidewall and the radial interior sidewall and extending inwardly perpendicularly to the axis of rotation. A plurality of inlet ports are formed in and spaced circumferentially about the radial exterior sidewall. A plurality of outlet ports are formed in and spaced circumferentially about the radial interior sidewall. A plurality of bores are formed through the core area coupling each of the plurality of outlets ports to one of the plurality of inlet ports. The plurality of bores define a plurality of ducts that fluidly communicate the inlet ports and the outlet ports. Each duct of the plurality of ducts is configured such that a cooling airflow may pass radially inwardly with minimal tangential stress and minimal static pressure loss.

In still another embodiment, and by way of example only, provided is a gas turbine engine including a compressor section including an intermediate pressure compressor and a high pressure compressor; a rotary shaft interconnecting the intermediate pressure compressor and the high pressure compressor in torque transmitting relationship about an axis of rotation; a collecting chamber arranged to collect pressurized, substantially nonswirling, cooling airflow from the compressor section at a location radially outward of the rotary shaft; and a vortex spoiler interconnected to rotate with the rotary shaft and in fluidic communication with the collecting chamber, the vortex spoiler defined by a radial exterior sidewall and a radial interior sidewall disposed radially inward of, and surrounded by the radial exterior sidewall and including a plurality of inlet ports formed in and spaced circumferentially about the radial exterior sidewall and a plurality of outlet ports formed in and spaced circumferentially about the radial interior sidewall, each of the plurality of inlet ports coupled to one of the plurality of outlet ports via a bore, and defining a plurality of ducts that fluidly communicate the inlet ports and the outlet ports, each duct configured having an interior diameter at each of the plurality of inlet ports formed at a preselected angle in a range of approximately 65-75 degrees normal to a surface of the radial exterior sidewall and at each of the plurality of outlet ports having an interior diameter formed at a preselected angle in a range of approximately 15-25 degrees normal to a surface of the radial interior sidewall such that a cooling airflow passes radially inwardly through each of the plurality of ducts with minimal tangential stress and minimal static pressure loss.

Other independent features and advantages of the preferred methods will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Before proceeding with a detailed description, it is to be appreciated that the described embodiment is not limited to use in conjunction with a particular type of turbine engine, or even to use in a turbine. Thus, although the present embodiment is, for convenience of explanation, depicted and described as being implemented in a turbofan gas turbine jet engine, it will be appreciated that it can be implemented in various other types of turbines, and in various other systems and environments.

Figure 1:
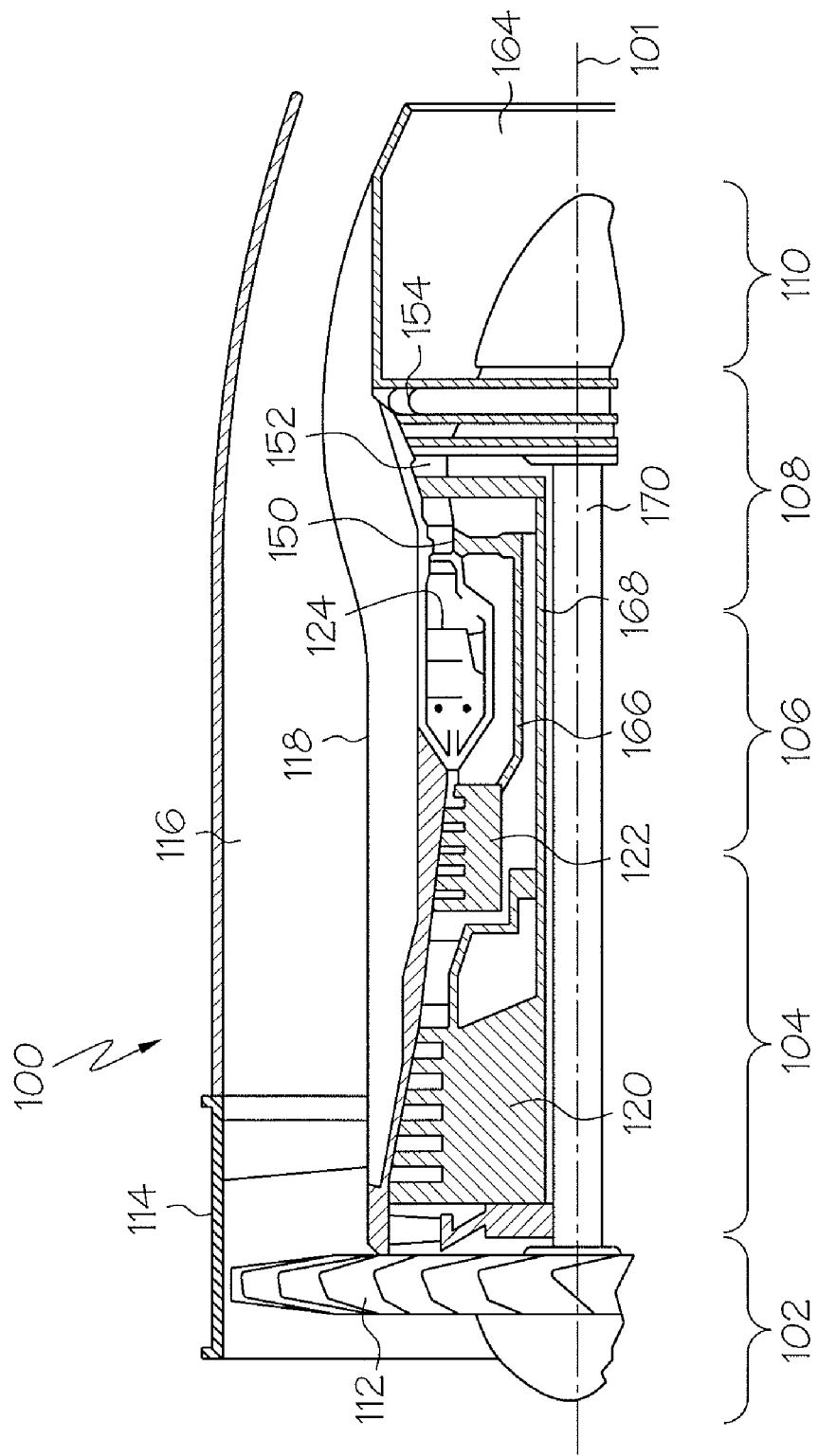
FIG. 1 is a simplified is a perspective view of an exemplary turbine engine according to the present invention.
Figure 2:
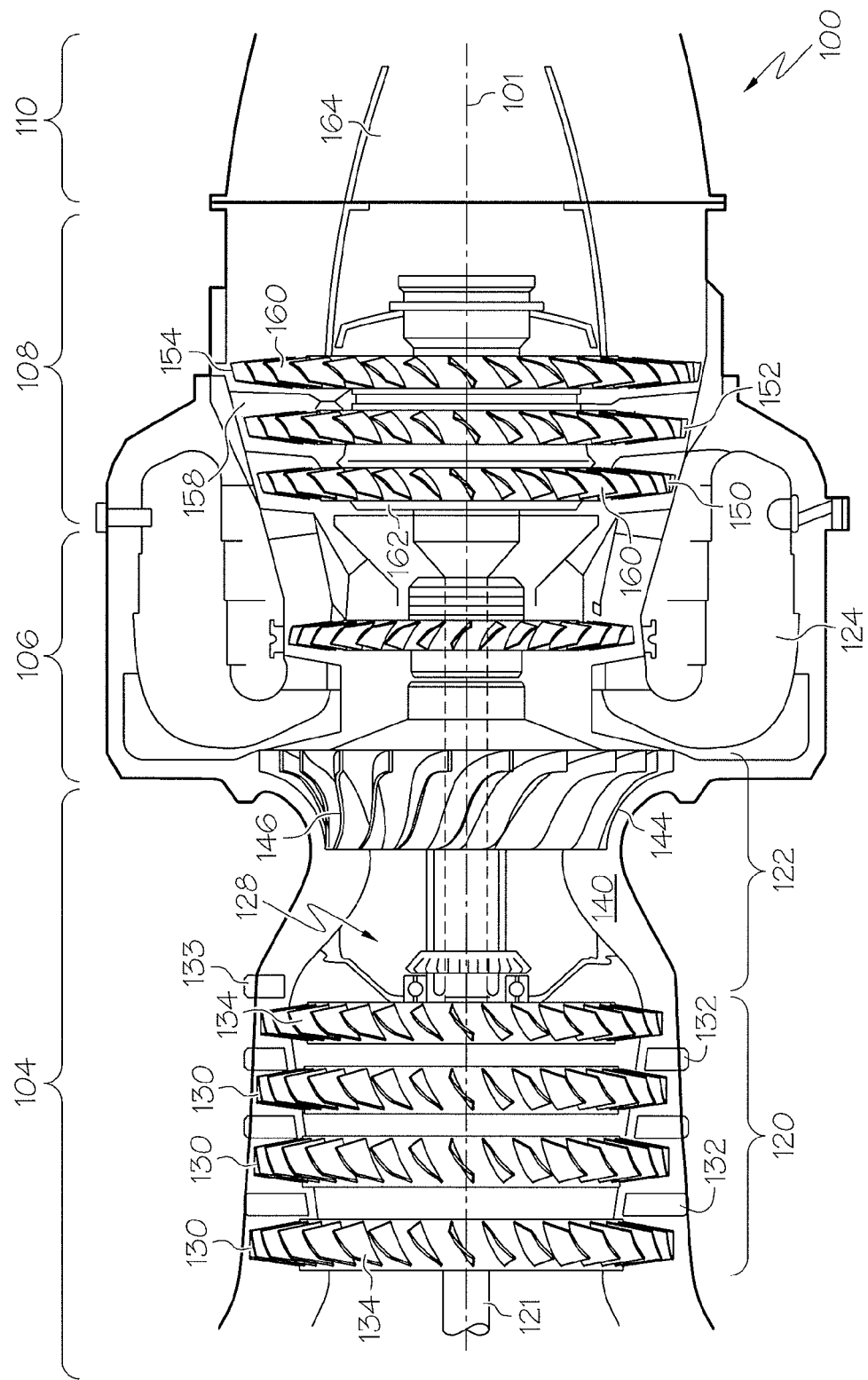
FIG. 2 is a close up cross-section side view of the compressor, combustor, turbine, and exhaust sections of the exemplary gas turbine engine depicted in FIG. 1.

Referring now to FIGS. 1 and 2, an exemplary embodiment of a turbofan gas turbine jet engine 100 is depicted in FIG. 1 and includes an intake section 102, a compressor section 104, a combustion section 106, a turbine section 108, and an exhaust section 110. In FIG. 1, only half the structure is shown, it being substantially rotationally symmetric about a centerline and axis of rotation 101. FIG. 2 illustrates a close up cross-section side view of the compressor 104, combustor 106, turbine 108 and exhaust sections 110 of the exemplary gas turbine engine depicted in FIG. 1. As best illustrated in FIG. 1, the intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressor stages; an intermediate pressure compressor 120 and a high pressure compressor 122 interconnected by a rotary shaft 121 and a secondary cooling airflow system 123. The rotary shaft 121 interconnecting the intermediate pressure compressor 120 and the high pressure compressor 122 in torque transmitting relationship. The intermediate pressure compressor 120 raises the pressure of the air directed into it from the fan 112, and directs the compressed air into the high pressure compressor 122. As best illustrated in FIG. 2, the intermediate pressure compressor 120 includes multiple stages, each including a rotor 130 and a stator 132. Each of the rotors 130 has a plurality of rotor blades 134. As the rotors 130 rotate, the rotor blades 134 force air through each of the stators 132 in a subsequent stage.

The high pressure compressor 122, in the depicted embodiment, includes a high pressure diffuser case 140 and a rotationally mounted high pressure impeller 144. The high pressure diffuser case 140 couples the intermediate pressure compressor 120 to the high pressure compressor 122 and directs exhausted air into the high pressure impeller 144. The high pressure impeller 144 has a plurality of vanes 146 extending therefrom that accelerate and compress the air. The high pressure impeller 144 compresses the air still further, and directs the high pressure air into the combustion section 106.

In the combustion section 106, which includes a combustor 124, the high pressure air is mixed with fuel and combusted. The combustor 124 receives the high pressure air from the compressor section 104 and mixes it with fuel to generate combusted air. The combusted air is then directed into the turbine section 108.

In this particular example, the turbine section 108 includes three turbines disposed in axial series flow, although it should be understood that any number of turbines may be included according to design specifics. More specifically, FIG. 1 depicts a high pressure turbine 150, an intermediate pressure turbine 152, and a low pressure turbine 154. Propulsion gas turbine engines may comprise only a high pressure turbine and a low pressure turbine. The expanding combusted air from the combustion section 106 expands through each turbine, causing it to rotate. More specifically, the hot combustion gases generated by the combustor 124 are directed against the stationary turbine vanes 158. The stationary turbine vanes 158 turn the high velocity gas flow partially sideways to impinge on a plurality of turbine blades 160 mounted on rotatable turbine disks 162 in each of the high pressure turbines 150, 152 and 154. The force of the impinging gas causes the rotatable turbine disks 162 to spin at high speed. The air is then exhausted through a propulsion nozzle 164 disposed in the exhaust section 110, providing addition forward thrust. As the high pressure turbines 150, 152 and 154 rotate, each drives equipment in the engine 100 via concentrically disposed shafts or spools as best seen in FIG. 1. Specifically, the high pressure turbine 150 drives the high pressure compressor 122 via a high pressure spool 166, the intermediate pressure turbine 152 drives the intermediate pressure compressor 120 via an intermediate pressure spool 168, and the low pressure turbine 154 drives the fan 112 via a low pressure spool 170. Engines may comprise one spool, two spools, or three spools.

Figure 3:
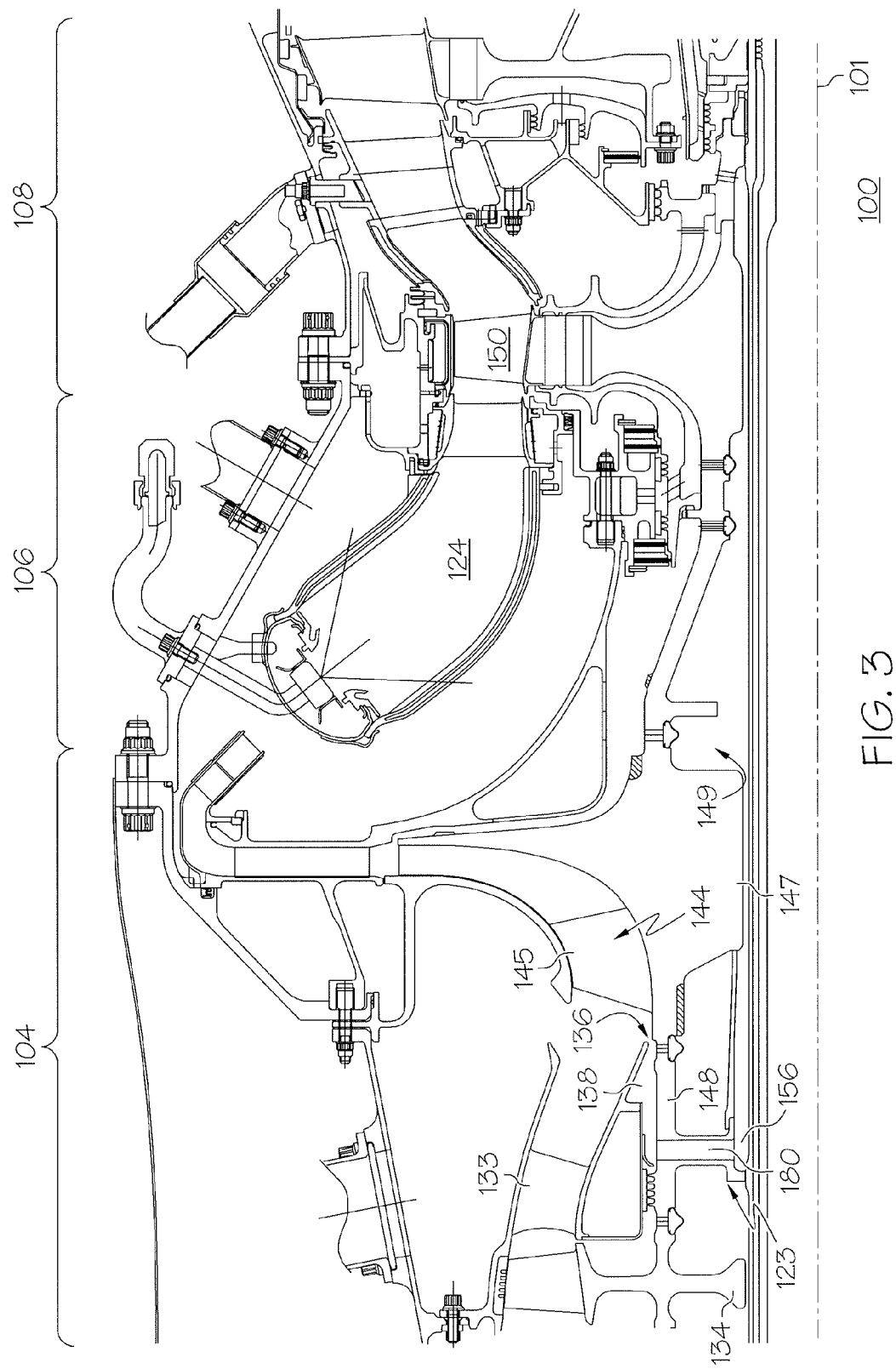
FIG. 3 is a close up cross-section side view of a portion of the compressor, combustor and a portion of the turbine sections of the exemplary gas turbine engine depicted in FIG. 1 illustrating a vortex spoiler according to the present invention.

Referring now to FIG. 3, illustrated is a more detailed view of portions of the compressor section 104, the combustion section 106, and the turbine section 108. More specifically, illustrated in greater detail is the secondary cooling airflow system 123. In FIG. 3, again only half the structure is shown, it being substantially rotationally symmetric about the centerline and axis of rotation 101. Illustrated is a portion of the high pressure impeller 144, including an impellor blade 145 and an impeller hub 147. As previously stated, stators 132 (FIG. 2), generally formed as stationary blades, cross the airflow path between sets of compressor stages within the intermediate pressure compressor 120. A final stationary vane, or diffuser vane 133, acts as a diffuser for deswirling and diffusing the pressurized airflow just prior to its entry to the high pressure compressor 122.

An opening 136 downstream of diffuser vane 133 allows diffused, pressurized cooling airflow to enter a collecting chamber 138 in a substantially non-swirling condition. A vortex spoiler 180 is positioned in communication with the collecting chamber 138, and is rigidly secured to a rotary member 148 for rotation therewith. The vortex spoiler 180 provides additional cooling for downstream components, such as those found in the combustor section 106 and turbine section 108. A hub 156 extends axially between and couples the vortex spoiler 180 to the high pressure compressor 122.

Figure 4:
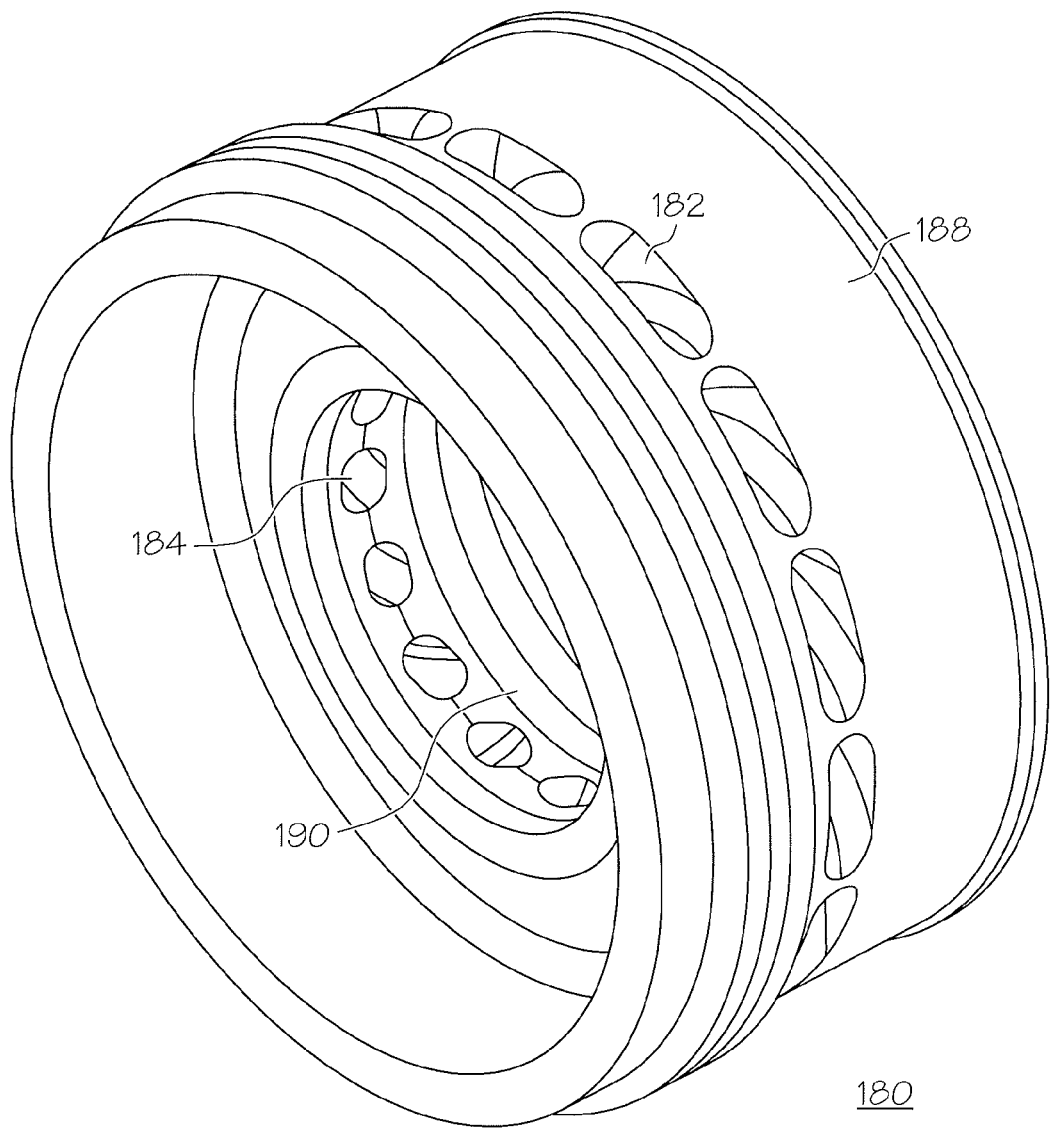
FIG. 4 is an orthogonal view of the vortex spoiler according to the present invention.
Figure 5:
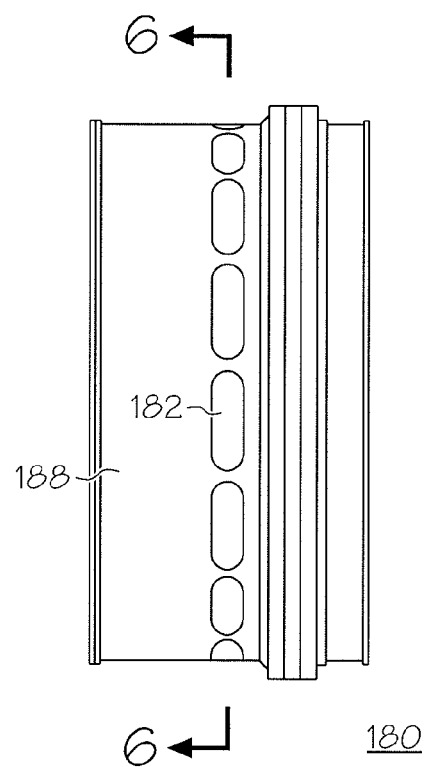
FIG. 5 is a side view of the vortex spoiler of FIG. 4.
Figure 6:
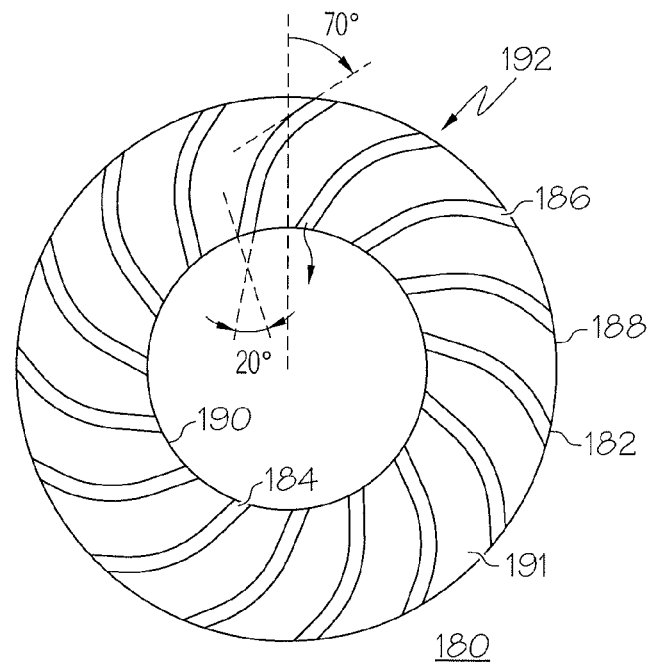
FIG. 6 is a cross-sectional view taken through line 6-6- of FIG. 5.
Figure 7:
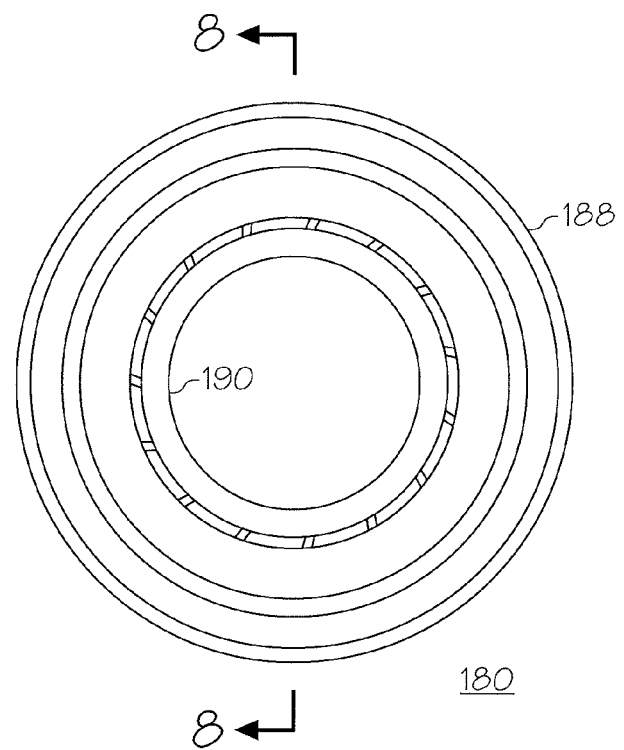
FIG. 7 is a front view of the vortex spoiler of FIG. 7.
Figure 8:
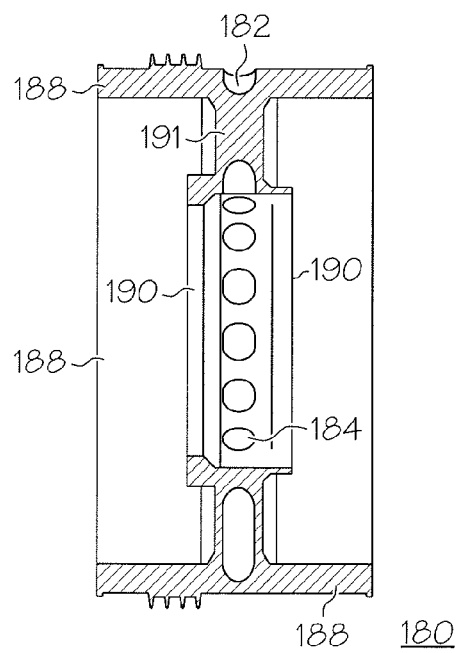
FIG. 8 is a cross-sectional view taken through line 8-8 of FIG. 7.

Referring now to FIGS. 4-8, schematic representations of the vortex spoiler 180, is depicted. The vortex spoiler 180 differs from traditional designs in that it uses a curve rotated profile instead of a straight radially configured profile. Referring more specifically to FIGS. 4 and 5, illustrated in simplified orthogonal view and a side view is an embodiment of the vortex spoiler 180, including a plurality of inlet ports 182 and a plurality of outlet ports 184. Referring now to FIG. 6, as best shown in a side sectional view taken through line 6-6 of FIG. 5, each pairing of an inlet port 182 and an outlet port 184 defines a passageway, or duct, 186 there between. As best illustrated in a front view in FIG. 7, and a side sectional view taken through line 8-8 of FIG. 7, the vortex spoiler 180 is further defined by a radial exterior sidewall 188 and a radial interior sidewall 190. The radial exterior sidewall 188 and the radial interior sidewall 190 define there between a core area 191 best illustrated in FIG. 6, through which the plurality of ducts 186 are formed. The plurality of ducts 186 extend axially between the radial exterior sidewall 188 and the radial interior sidewall 190, and through the core 191, to provide for the flow of a cooling airflow 192.

The plurality of ducts 186 are configured such that the radial inner end of each of the plurality of ducts 186, proximate each of the plurality of outlet ports 184, is as large as possible. More particularly, the entirety of the plurality of ducts 186 are maintained at as substantially as large a cross section as reasonably possible to avoid a velocity increase and subsequent pressure drop of the cooling airflow 192 in the plurality of ducts 186. As previously stated, the vortex spoiler 180 incorporates a curved rotated profile. More specifically, as best illustrated in FIG. 6, each of the plurality of ducts 186 are formed having a curved rotated profile in relation to their inlet port 182 and their outlet port 184.

During fabrication, the vortex spoiler 180 is machined using an end mill process. In a typical milling process well known in the art, a collet of a drill is positioned 90 degrees normal to a billet surface. To machine each of the plurality of ducts 186 of the vortex spoiler 180, the initial drilling process would create a bore having an interior diameter at each inlet port 182 formed at a preselected angle in a range of 65-75 degrees normal to the surface of the radial exterior sidewall 188, and preferably at a preselected angle of 70 degrees normal to the surface of the radial exterior sidewall 188, instead of the typical 90 degrees. During machining, the curved rotated profile is formed by rotating the lower inner diameter section of the bore 191, and more specifically forming the bore 191 having an interior diameter at each outlet port 184 formed at a preselected angle in a range of 15-25 degrees normal to the surface of the radial interior sidewall 190, and preferably at a preselected angle of 20 degrees normal to the surface of the radial interior sidewall 190 as best illustrated in FIG. 6. This allows for each of the plurality of ducts 186 to have an entrance angle at each of the plurality of inlet ports 182 of approximately 70 degrees relative to the surface of the radial exterior sidewall and an exit angle at each of the plurality of outlet ports 184 of approximately 20 degrees relative to the surface of radial interior sidewall 190.

The curved rotated profile of the plurality of ducts 186 provides reduced pressure loss and up to approximately 25% more mass flow to downstream turbine components. The percentage of preservation of static pressure varies proportionately with total mass flow of the secondary air flow, i.e., a larger total mass flow would result in a proportionately larger preservation of static pressure. In the depicted embodiment, the vortex spoiler 180 having a curved rotated profile provides for a reduction in the static pressure drop by approximately 20% and in turn provides more pressure (about 2-3.5 pounds more pressure) towards an exit of a duct 149 (FIG. 3) that leads directly to turbine section 108 (FIG. 3). In addition, tangential stresses are also reduced with the vortex spoiler 180 yielding approximately 17% less stress concentration at the plurality of inlet ports 182 of the vortex spoiler 180.

The vortex spoiler described herein thus provides an improved secondary cooling means for turbine engine components. The vortex spoiler utilizes a curved radially profile, defined by a plurality of bores offset at an angle approximately 70 degrees normal to the surface at an inlet port, and having an outlet port radially curved at an angle of approximately 20 degrees offset from the inlet port. The new design of the vortex spoiler improves the overall cooling delivery means by decreasing static pressure loss and tangential stresses.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A vortex spoiler for delivery of a cooling airflow in a turbine engine comprising:

a radial exterior sidewall positioned to rotate about an axis of rotation;
a radial interior sidewall disposed radially inward of, and surrounded by, the radial exterior sidewall;
a core area coupled between the radial exterior sidewall and the radial interior sidewall, the core area extending inwardly perpendicularly to the axis of rotation, the radial exterior sidewall, the radial interior sidewall and the core area defining a discrete vortex spoiler;
a plurality of inlet ports formed in and spaced circumferentially about the radial exterior sidewall;
a plurality of outlet ports formed in and spaced circumferentially about the radial interior sidewall, the plurality of outlet ports configured to provide an outlet for the cooling airflow from the vortex spoiler; and
a plurality of bores extending through the core area coupling each of the plurality of outlet ports to one of the plurality of inlet ports and defining a plurality of ducts that fluidly communicate the inlet ports and the outlet ports, each duct configured such that a cooling airflow may pass radially inwardly with minimal tangential stress and minimal static pressure loss.

2. A vortex spoiler as claimed in claim 1, wherein each of the plurality of bores extends radially inward in a curved rotated profile from one of the plurality of inlet ports to one of the plurality of outlet ports.

3. A vortex spoiler as claimed in claim 1, wherein the plurality of ducts defined by the plurality of bores extends radially from the radial exterior sidewall, through the core area, to the radial interior sidewall.

4. A vortex spoiler as claimed in claim 1, wherein each of the plurality of ducts is formed having an interior diameter at each of the plurality of inlet ports formed at a preselected angle in a range of 65-75 degrees normal to a surface of the radial exterior sidewall.

5. A vortex spoiler as claimed in claim 4, wherein each of the plurality of ducts is formed having an interior diameter at each of the plurality of inlet ports formed at a preselected angle of 70 degrees normal to the surface of the radial exterior sidewall.

6. A vortex spoiler as claimed in claim 1, wherein each of the plurality of ducts is formed having an interior diameter at each of the plurality of outlet ports formed at a preselected angle in a range of 15-25 degrees normal to surface of the radial interior sidewall.

7. A vortex spoiler as claimed in claim 6, wherein each of the plurality of ducts is formed having an interior diameter at each of the plurality of outlet ports formed at a preselected angle of 20 degrees normal to a surface of the radial interior sidewall.

8. A gas turbine engine having a compressor section that includes a plurality of rotary compressor stages interconnected by a rotary shaft and a secondary cooling airflow system comprising:
a collecting chamber arranged to collect pressurized, substantially nonswirling, cooling airflow from the compressor section; and
a vortex spoiler in fluidic communication with the collecting chamber and interconnected to rotate with the rotary shaft, the vortex spoiler comprising:
a radial exterior sidewall;
a radial interior sidewall disposed radially inward of, and surrounded by, the radial exterior sidewall;
a core area coupled between the radial exterior sidewall and the radial interior sidewall and extending inwardly perpendicularly to the axis of rotation, the radial exterior sidewall, the radial interior sidewall and the core area defining a discrete vortex spoiler component;
a plurality of inlet ports formed in and spaced circumferentially about the radial exterior sidewall
a plurality of outlet ports formed in and spaced circumferentially about the radial interior sidewall, the plurality of outlet ports configured to provide an outlet for the cooling airflow from the vortex spoiler; and
a plurality of bores formed through the core area coupling each of the plurality of outlets ports to one of the plurality of inlet ports, the plurality of bores defining a plurality of ducts that fluidly communicate the inlet ports and the outlet ports, each duct configured such that a cooling airflow may pass radially inwardly with minimal tangential stress and minimal static pressure loss.

9. A gas turbine engine as claimed in claim 8, wherein each of the plurality of bores extends radially inward in a curved rotated profile from one of the plurality of inlet ports to one of the plurality of outlet ports.

10. A gas turbine engine as claimed in claim 8, wherein each of the plurality of bores extends radially from the radial exterior sidewall, through the core area, to the radial interior sidewall.

11. A gas turbine engine as claimed in claim 8, wherein each of the plurality of ducts is formed having an interior diameter at each of the plurality of inlet ports formed at a preselected angle in a range of 65-75 degrees normal to a surface of the radial exterior sidewall.

12. A gas turbine engine as claimed in claim 11, wherein each of the plurality of ducts is formed having an interior diameter at each of the plurality of inlet ports formed at a preselected angle of 70 degrees normal to the surface of the radial exterior sidewall.

13. A gas turbine engine as claimed in claim 8, wherein each of the plurality of ducts is formed having an interior diameter at each of the plurality of outlet ports formed at a preselected angle in a range of 15-25 degrees normal to surface of the radial interior sidewall.

14. A gas turbine engine as claimed in claim 13, wherein each of the plurality of ducts is formed having an interior diameter at each of the plurality of outlet ports formed at a preselected angle of 20 degrees normal to a surface of the radial interior sidewall.

15. A gas turbine engine, comprising:
a compressor section including an intermediate pressure compressor and a high pressure compressor;
a rotary shaft interconnecting the intermediate pressure compressor and the high pressure compressor in torque transmitting relationship about an axis of rotation;
a collecting chamber arranged to collect pressurized, substantially nonswirling, cooling airflow from the compressor section at a location radially outward of the rotary shaft; and
a discrete vortex spoiler interconnected to rotate with the rotary shaft and in fluidic communication with the collecting chamber, the discrete vortex spoiler defined by a radial exterior sidewall and a radial interior sidewall disposed radially inward of, and surrounded by the radial exterior sidewall; and a core area coupled between the radial exterior sidewall and the radial interior sidewall, the core area extending inwardly perpendicularly to the axis of rotation, the discrete vortex spoiler including a plurality of inlet ports formed in and spaced circumferentially about the radial exterior sidewall and a plurality of outlet ports formed in and spaced circumferentially about the radial interior sidewall, each of the plurality of inlet ports coupled to one of the plurality of outlet ports via a bore, and defining a plurality of ducts that fluidly communicate the inlet ports and the outlet ports, each duct configured having an interior diameter at each of the plurality of inlet ports formed at a preselected angle in a range of approximately 65-75 degrees normal to a surface of the radial exterior sidewall and at each of the plurality of outlet ports having an interior diameter formed at a preselected angle in a range of approximately 15-25 degrees normal to a surface of the radial interior sidewall such that a cooling airflow passes radially inwardly through each of the plurality of ducts with minimal tangential stress and minimal static pressure loss.

16. A gas turbine engine as claimed in claim 15, wherein the compressor section further includes a diffuser vane positioned between the intermediate pressure compressor and the high pressure compressor, the collecting chamber positioned to receive a cooling airflow from the intermediate pressure compressor as it discharges from the diffuser vane.

17. A gas turbine engine as claimed in claim 15, wherein the interior diameter of each of the plurality of ducts at each of the plurality of inlet ports is formed at a preselected angle of 70 degrees normal to a surface of the radial exterior sidewall.

18. A gas turbine engine as claimed in claim 17, wherein the diameter of each of the plurality of ducts at each of the plurality of outlet ports is formed at a preselected angle of 20 degrees normal to a surface of the radial interior sidewall.

19. A gas turbine engine as claimed in claim 15, wherein the diameter of each of the plurality of ducts at each of the plurality of outlet ports is formed at a preselected angle of 20 degrees normal to a surface of the radial interior sidewall.

* * * * *